United States Patent [19]

Elliott

[11] 4,276,502

[45] Jun. 30, 1981

[54] SOLID STATE CONTROLLER

[75] Inventor: Harry S. Elliott, Houston, Tex.

[73] Assignee: Varco, Inc., Houston, Tex.

[21] Appl. No.: 900,926

[22] Filed: Apr. 28, 1978

Related U.S. Application Data

[60] Division of Ser. No. 727,001, Sep. 27, 1976, which is a continuation of Ser. No. 495,142, Aug. 6, 1974, abandoned.

[51] Int. Cl.³ .............................................. G05B 23/02
[52] U.S. Cl. ................................. 318/565; 318/599; 318/615
[58] Field of Search .................. 318/599, 565, 615; 361/92

[56] References Cited

U.S. PATENT DOCUMENTS

| 3,445,746 | 5/1969 | Delatorre | 361/92 |
| 3,686,557 | 8/1972 | Futamura | 318/599 |
| 3,778,696 | 12/1973 | Walters et al. | 318/565 |

Primary Examiner—J. V. Truhe
Assistant Examiner—Eugene S. Indyk
Attorney, Agent, or Firm—David M. Ostfeld

[57] ABSTRACT

An improved alternating current prime mover control system and method for, for example, the control of a valve position or other physical variable whose state can be sensed or calculated wherein the state of the physical variable is compared with a reference variable to generate, in conjunction with a waveform generator, a fixed amplitude signal that has variable time duration which feeds a part of the control system that drives the alternating current prime mover source in more than one direction.

3 Claims, 4 Drawing Figures

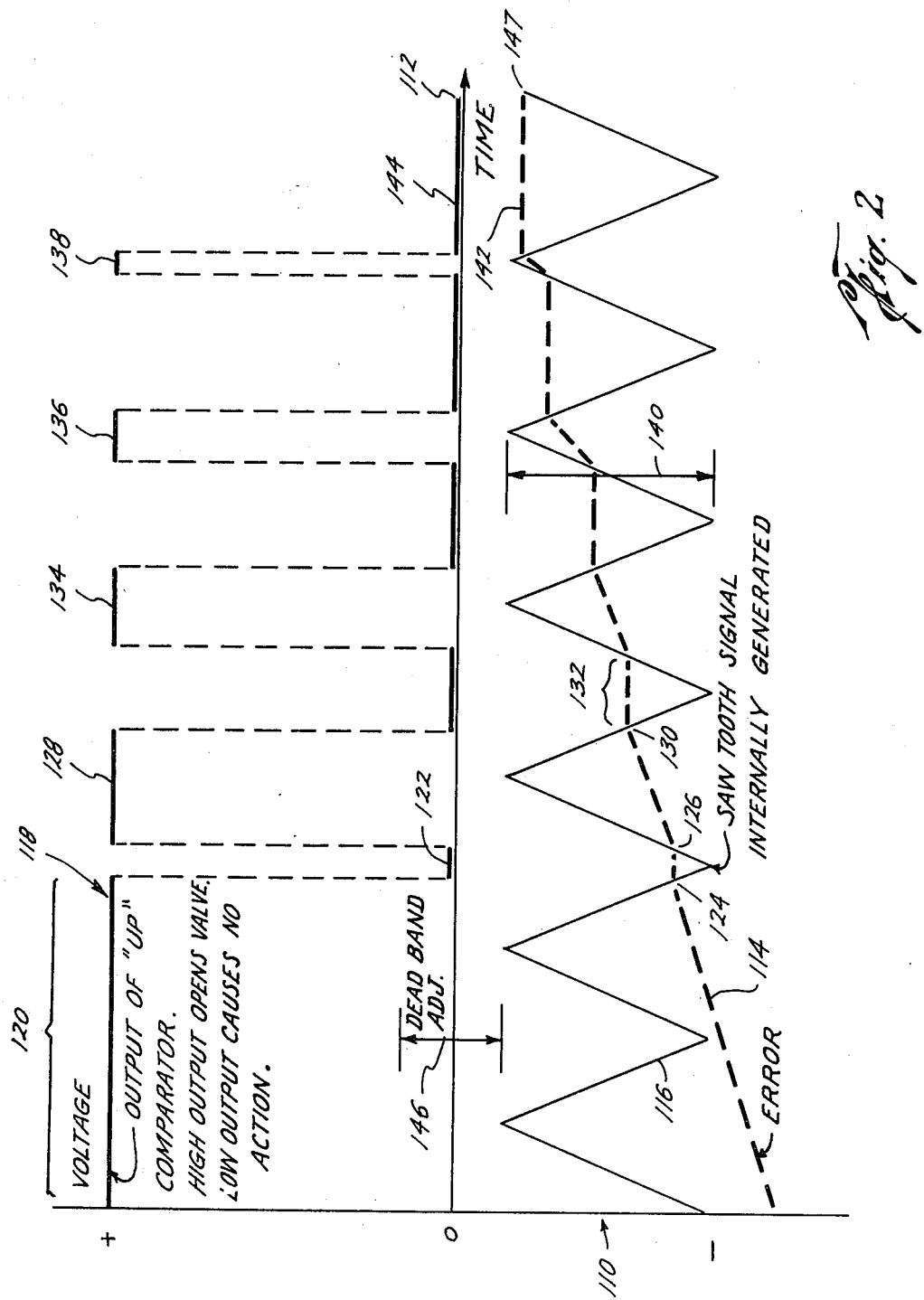

SOLID STATE CONTROLLER

This is a division of application Ser. No. 727,001, filed Sept. 27, 1976, which is a continuation of parent application Ser. No. 495,142, filed Aug. 6, 1974 now abandoned.

FIELD OF THE INVENTION

This invention relates to automatic alternating current electric controllers and more specifically to solid state controllers adapted to sense the state of and alter physical variables by means of alternating current prime movers.

BACKGROUND OF THE INVENTION

Alternating current control systems ordinarily use solid state control logic to control conventional relays that switch power to prime movers to control physical variables. Unfortunately, conventional relays generate radio frequency interference (RFI) that causes logic errors in digital control circuitry. See D. Shoup, Radio Frequency Interference, *Instruments & Control Systems,* July 1974, p-63-66. Voltage output of a sensor in a conventional control circuit is fed to a difference amplifier. Output from this amplifier is fed to a separate comparator and combined with an electrically generated signal from an associated generator to yield time proportionate output pulses. Time proportionate, as used in this context, means duration of output pulses from the comparator is a function of the magnitude of the error signal introduced to the comparator. See W. Sahm, Solid State Relays aren't all Alike, *Electronic Products Magazine,* July 15, 1974, p-50-58. Output of each of these comparators is then used to switch a relay, or other mechanical switching means. It is well-known in the art to use these separate comparators to control triacs, or other solid state switching units such as solid state relays. See D. R. Grafhom, et al *SCR Manual,* 5th Edition 1972 (General Electric) p-327-332. Conventional control circuits generally compare a sensed voltage to a reference voltage and outputs the difference between these voltages as an error signal. The error signal controls a solid state switch that in turn controls a prime mover. Normally two difference amplifiers are required. Signals generated as outputs by the difference amplifiers act to control two solid state or mechanical switches that, in turn, drive the prime mover between its extreme operational limits. Conventional time proportionation is accomplished by inserting a comparator in the circuit between the difference amplifier and the switch. The comparator has another input from an electrical signal generator. The comparator produces an output pulse only if the difference between the amplitude of the electrical signal and the amplitude of the output of the difference amplifier, the error signal, is either positive or negative, as may be determined by the designer of the system. Because the signal generator can produce any desired amplitude and waveform, the amplitude of the output of the generator is a known function of time. The magnitude of the error signal outputed by the difference amplifier will be a function of the difference between the amplitude of the reference signal and the sensor signal. Thus, the error signals magnitude is a function of the amount of correction needed to conform the physical variable to the desired state. The comparator, having these two signals as input, produces output pulses of duration dependent upon the output of the generator, and the amplitude of the output error signal of the difference amplifier. In a conventional systems, the output of these two comparators will each be fed to a solid state switch, which will control a prime mover and the prime mover will alter the controlled physical variable.

Such a conventional system only increases or decreases the physical variable's state and performs that function at a fixed rate. See C. P. Knudsen, Solid-state approaches to cooking-range control. *The RCA Solid State* 1974 *Data Book,* RCA, p-463-494. Generally, such a system uses a triac controller and a triac that in turn controls the prime mover. Such triac controllers and triacs are well-known. See C. Hitchkiss, et al, Relays don't have to Click or Chatter, *Instruments and Control Systems,* July 1974, p-55-58 and E. Dowdell, The Solid State Relay, *Electronic Products Magazine,* July 15, 1974, p-47-50. Generally it is desirable to switch triacs on and off very close to zero volts and then increase the voltage through the triac. This procedure avoids problems associated with sudden switching of high voltage, high current loads. For a discussion of the state of the art see, R. Hood, Application of the M A742 Triagac: A zero crossing AC trigger, Fairchild (1970), p-9-14.

The cited art well describes the state of the art of solid state electronic switching. Most conventional systems use a hybrid of solid state logic control circuits and electromechanical relays for power control. These hybrids are subject to RFI problems as well as to maintenance problems associated with all electromechanical devices having moving parts. The most sophisticated solid state systems known to the inventor, other than the present invention, utilize zero voltage triac switching and time proportionating. These systems operate to vary the AC prime mover of the controlled physical variable only in one direction. Further, this variance is accomplished at a fixed rate. Finally, all conventional systems that use difference amplifiers to generate error signals are dependent on input of both a sensor voltage and a reference voltage. Failure or interruption of either of these voltages causes the difference amplifier to generate an extremely large error signal and the control system to actuate the prime mover toward an extreme state of the variable under control.

SUMMARY OF THE INVENTION

In the present invention voltage outputs from a reference source and a sensor drive a single difference amplifier. The error signal provided by this amplifier is combined with the output of a waveform generator to produce a signal that is the average of the error signal and the waveform. The error signal, the average signal, and the waveform from the waveform generator are all fed into a dual comparator. Specifically, one comparator of the dual comparator is responsive to the average signal and produces a pulse at a first output whenever the average signal is greater than ground potential. The second comparator is responsive to the difference between the error signal and the signal from the waveform generator and is adapted to produce an output signal whenever the difference between these two signals is less than the ground potential of the circuit. The dual comparator, in the preferred embodiment of the invention, is adapted so the operation of either comparator in the dual comparator inhibits the operation of the other. The reference signal is also optionally used as input to a failure protection circuit. This failure projection circuit is adapted to remove the signal necessary to the operation of the dual comparator if no reference voltage is sensed. Thus, reference signal failure inhibits the dual comparator's operation and prevents operation of the prime mover until the reference signal is restored and an external signal is received to start the controller again. Output from the dual comparator consists of two signals one to increase and one to decrease the state of the controlled physical variable. These outputs control identical solid state switches, only one of which will be described.

Output from the dual comparator is an input, through an optoelectric isolator, to a comparator triac controller. This triac controller operates to control a triac that, in turn, controls an AC prime mover by controlling its energy source. The triac controller produces output pulses only when it receives an input pulse from the dual comparator. Additionally, the comparator section of the triac controller may be adapted so the triac controller only activates the triac when it receives pulses from both the output of the dual comparator and from an associated waveform generator, which may be of variable amplitude and frequency. Thus, the time proportionated output of the dual comparator may be again time proportinated in the triac controller circuit. This varies the amount of time during the time proportionated pulse from the dual comparator that the triac will actually be switched on. This allows the operator of the control system, by varying the amplitude and frequency of the waveform introduced to the comparator triac controller, to vary rate of change effected by the AC prime mover.

The essence of the invention, then, is the bidirectional control of the state of a physical variable by means of one or more AC prime movers. Depending on the magnitude and polarity of an error signal, the controller will shift the state of the controlled variable up or down. The preferred embodiment of the invention also has a means for varying the rate of state change in both the up and the down direction and provides for protection against the loss of reference signal to insure the AC prime mover will not drive the controlled variable to an extreme state if the reference signal fails.

BRIEF DESCRIPTION OF THE DRAWINGS

FIG. 2 is a graph showing the relationship between the error signal, the sawtooth wave signal, and the output of a triac in the preferred embodiment of the solid state controller of the present invention;

DESCRIPTION OF THE PREFERRED EMBODIMENT

Figure 1:
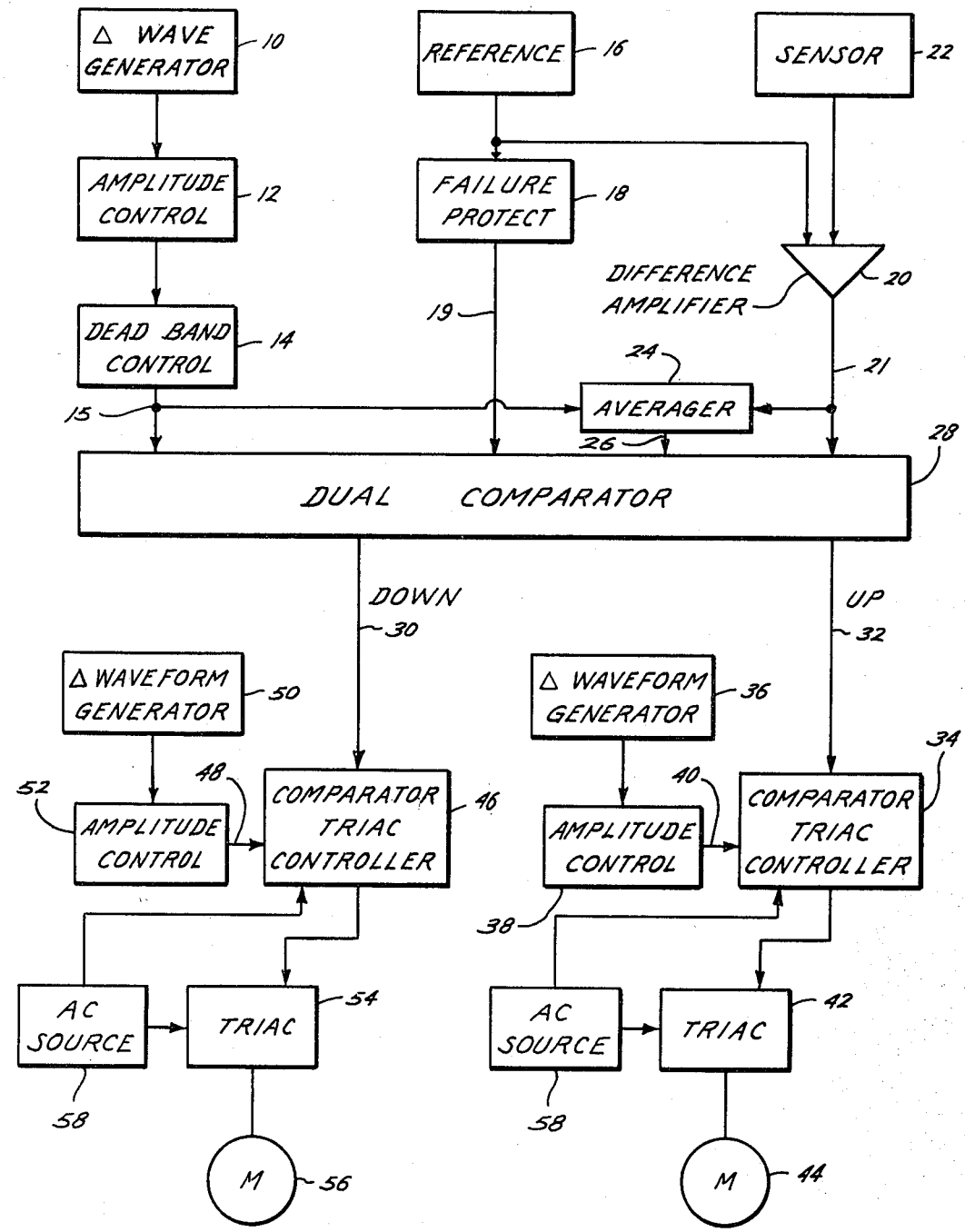
FIG. 1 is a functional block diagram of a preferred embodiment of the solid state controller of the present invention.

In FIG. 1, wave generator 10 is connected to amplitude control 12 that is connected to deadband control 14 having an output 15. Reference voltage supply source 16 is connected to failure protection circuit 18 and to difference amplifier 20. State sensor 22 is connected to difference amplifier 20. Difference amplifier 20 has an output 21 that is connected to averager 24. Output 15 from deadband control 14 is also connected to averager 24. Failure protection circuit 18 has an output 19 and averager 24 has an output 26. Deadband controller 14 output 15, failure protection circuit 18 output 19, averager 24 output 26 and difference amplifier 20 output 21 are connected to dual comparator 28. Dual comparator 28 has a "down" output 30 and an "up" output 32. "Up" output 32 is connected to a comparator triac controller 34. A waveform generator 36 is connected to amplitude controller 38 whose output 40 is also an input, as is the output from AC source 58 to comparator triac controller 34. Comparator triac controller 34 is connected to traic 42 that is connected to AC prime mover 44 to regulate the power from AC source 58 to AC prime mover 44.

Down output 30 of dual comparator 38 is connected to comparator triac controller 46. Also connected to triac comparator controller 46 is output 48 of waveform generator 50. Amplitude controller 52 is connected between generator 50 and output 48. AC source 58 is also connected to comparator triac controller 46. Comparator triac controller 46 is connected to triac 54 which is connected to AC prime mover 56, which may be part of AC prime mover 44 and is used to regulate the power from AC source 58 to AC prime mover 56.

In normal operation, the control system illustrated in FIG. 1 will be associated with a means controlling a physical variable, such as a valve controlling a fluid's flow. Functionally, sensor 22 produces a voltage having a magnitude proportional to the state of the controlled means, such as, for example, a valve. A reference voltage is supplied by reference voltage source 16. Both of these voltages are introduced as inputs to difference amplifier 20. Difference amplifier 20 produces an output that is an error signal. The error signal is proportional in magnitude and polarity to the difference between the sensor and reference voltage levels. For example, the output may be positive when the sensor voltage level is higher than the reference voltage level. In that case, the difference amplifier's output would be negative if the sensor voltage level was less than the reference voltage level. The difference amplifier will only produce a voltage output of zero if the reference voltage and the sensor voltage are the same.

Waveform generator 10 generates an electric signal having a periodic waveform. This waveform may be of any desired frequency and geometry, e.g. a sine or sawtooth waveform. The output of generator 10 is introduced to amplitude control 12, which acts to control the magnitude of the peaks of the generated electric signal. The generated electric signal is offset from ground potential by a deadband controller that biases the signal with an adjustable potential. All of the above is well-known to the art of electrical engineering. The amplitude controlled and offset electrical signal generated by generator 10 is used as an input to averager 24. The other input to averager 24 is the error signal 21 from difference amplifier 20. The averager is a resistance network acting to produce a voltage that is a function of half the sum of the error signal's amplitude added to the waveform signal's amplitude. The shaped output 15 of the waveform generator 10, the error signal 21 produced by the difference amplifier 20, averager 24 signal 26, and an output 19 from failure protection circuit 18 are all inputs to dual comparator 28. It is the function of dual comparator 28 to output either an up 32 or a down 30 command time duration pulse depending on the polarity and magnitude of output 21 from difference amplifier 20. Further, the duration of this output pulse 30 or 32 is a function of the magnitude of the error signal produced by difference amplifier 20 relative to signal 15 of wave generator 10. Dual comparator 28 contains two comparators. Each comparator has two inputs. These inputs are function of the reference signal output 19, the error signal output 21 and waveform generator 10 output 15. For simplicity, the inputs shall be called input 1 and input 2. Whenever input 1 is more positive than the input 2 the output of the comparator will be zero. Conversely, whenever the input 1 is less positive than the input 2, then the comparator will produce an output pulse. Thus, for one of the comparators the output will be a positive voltage pulse whenever the error signal 21 is more negative than the electrically generated signal 15. The frequency and amplitude, as well as the offset from ground level, of the generated signal is controllable by amplitude control 12 and deadband control 14. The length of each pulse put out by the comparator will thus depend on the negative magnitude of the output of difference amplifier 20 and the settings of amplitude control 12 and deadband control 14. Where the error signal 21 is lage and negative, then the error signal will continuously be less than the amplitude of the electrically generated signal. As the error signal becomes smaller, sic less negative, it will be more positive than part of the cycle of the waveform generated by the waveform generator. During this part of the waveform cycle, the comparator will not produce an output pulse, but during the remainder of the waveform cycle the error signal will be less than the negative magnitude of the electric signal and the comparator will produce an output pulse. As the error signal becomes smaller, output pulses from the comparator will become shorter. Finally, the most positive portion of the waveform will be more negative than the error signal from difference amplifier 20 and the comparator will produce no output pulse. This is possible because the entire waveform produced by wave generator 10, whose amplitude is controlled by amplitude control 12, is offset from ground potential by deadband control 14. Deadband control 14 operates very simply by adding a controlled bias to the entire electrically generated signal. This may make every part in time of signal 15 negative to some degree. The degree of offset is controllable.

The input 1 signal lead of the other comparator of the dual comparator 28 is attached to ground potential and its input 2 is attached to output 26 of averager 24. When connected in this arrangement, this comparator will provide an output pulse only when the output 26 of averager 24 is greater than the ground potential of the circuit. The averager output will be greater than zero whenever the average of the sensor output and the waveform output is greater than zero. Functionally, when output 21 of difference amplifier 20 is extremely positive, the comparator will produce a continuous pulse. However, as the error signal 21 produced by difference amplifier 20 becomes more negative, i.e. less positive, addition of the relatively negative offset electrical signal 15 will cause portions of the resultant waveform, i.e. output 26 of averager 24, to be zero because the two inputs combine to be zero or negative. As this occurs, the pulses put out by this comparator will grow shorter as the difference between ground potential and the error signal grows less for a given setting of deadband controller 14 and amplitude control 12.

Each output from the comparators in the dual comparator 28 connects with a solid state switching means. This solid state switching means includes a triac controller 34 or 46, which is a comparator, and a traic. Triac controller 24 or 46 is located between output 32 or 30 respectively of dual comparator 28 and the input to triac 42 or 54 respectively. The controller interacts with the traic in such a way that an output pulse from the comparator 28 causes the controller to turn the traic on. Turning the triac on activates an AC prime mover that varies the state of the controlled variable. As shown in FIG. 1, the system could be a valve controlled by a motor. The motor would have a winding 56 that acts to close the valve and a winding 44 that acts to open the valve.

The comparator section of the triac controller has, as inputs, the output of the comparator 28, which is a time proportinated signal, and optionally output 48 of a second waveform generator 50, whose magnitude is controlled by amplitude control 52.

Functionally, this comparator works in exactly the same manner as the comparator described above. The control signal output 30 from a comparator of dual comparator 28 provides a voltage that is introduced to triac controller comparator 46. A varying voltage is introduced to the comparator's other input by waveform generator 50. The amplitude of this varying voltage is controlled by amplitude control 52. The output of triac controller 46, when arranged and connected in this manner, is a series of pulses whose widths are adjusted by the amplitude of electrical signal 48 introduced to the comparator. The total duration of all the pulses is controlled by the length of output 30 from the comparator of dual comparators 28. This is time proportionation of a time proportionated signal. It allows control of the length of the pulse to traic controller 46 and control of the percentage of time within this control pulse that triac 54 is actually switched on. With respect to the AC prime mover, this means the rate of change of state of the controlled variable can be altered. For example, one electrically generated signal's amplitude could be set to provide very short pulses and its associated AC prime mover would then only slowly change the state of the associated physical variable if the process gain were the same in both directions. The other solid state switching unit could be arranged to provide relatively wider output pulses within the control pulse 32. This would mean that AC prime mover 44 would be turned on during more of the time that a control pulse 32 was present from dual comparator 28 and the state of the controlled variable would change very rapidly if the process gain were the same in both directions. This second time proportination allows control to be maintained over the rate of change of the physical variable's state. It is also possible to effect a different rate of change in each of the directions that the state of the variable is being controlled.

FIG. 2 is a graph that illustrates the operation of the time proportinating means, ie the results of the comparators and electric signal generators, utilized in the preferred embodiment of the invention. The graph also illustrates the relationship between the control circuitry signals and power output conditions of the solid state switch that modulates the state of the physical variable under control without the second comparator.

The vertical axis 110 of the graph represents voltage and horizontal axis 112 of the graph represents time. These axes may be calibrated in any desired units. The error signal 114 initially provided by difference amplifier 20 is initially shown as more negative than the most negative going portion of sawtooth wave 116. As was discussed above, when the error signal input to the comparator is more negative than the other signal input to the comparator, then the comparator will put out an electric pulse. While this electric pulse is present, the switching circuit, ie triac controller 34 and triac 42, will operate to provide power 58 to AC prime mover 44. Prime mover 44, in turn, modulates the state of the parameter under control. On the graph this output that, without the second comparator, is also the output 34 without AC source input is shown as a positive voltage 118. This permits the flow of an AC voltage of any desired magnitude and frequency dependent on the selection of the triac. This AC power is either on, as is represented by the high output shown along portion 120 of the graph; or off, as is shown in portion 122. The output voltage will be on as long as error signal 114 is more negative than other input 116, the sawtooth electric signal. As long as output voltage from the control system is turned on, the prime mover will operate on the state of the controlled physical variable to reduce the magnitude of the error signal. This correction is represented on the graph by the upward slope of error signal 114. At some point, ie 124, reference sawtooth signal 116 that is internally generated by the electronics of the control system, becomes more negative than the error signal. At this point, as was discussed above, comparator 28 stops producing an output pulse. When output pulse 120 is not provided by the comparator, then the solid state switching means of the preferred embodiment of the invention turns off the output AC voltage, and, as shown on the drawing, terminates the power. This period of zero output lasts as long as sawtooth reference signal 116 is more negative than error signal 114. Because of the geometry of the waveform signal 116, i.e. a triangular waveform, changing potentials of error signal 114 will cause traic 42 to be turned off for shorter or longer periods of time. Once error signal 114 is more negative than reference wave form 116, as occurs at point 126, then comparator 28 again produces an output pulse 128 and causes the solid state switching means of the preferred embodiment of the invention to permit the voltage to actuate prime mover 44. During the time the switching system is turned on, producing output pulse 128, the slope of the error curve will rise. Thus, when the potential of the reference sawtooth waveform once again falls below that of the error signal at point 130, the length of time 132 that comparator 28 remains turned off is greater. Because of the geometry of the reference waveform and the upward slope of the error signal toward zero error, the amount of time the reference sawtooth waveform is more negative than the error signal grows greater as the amount of error, and thus the negative potential of the error signal, grow less. On the graph, time proportinating is represented by shorter duration voltage outputs pulses from the solid state switching means of the invention, ie pulses 134, 136 and 138. Not only are the pulses of shorter duration, but they are separated by longer intervals of time, as is apparent from the graph.

The potential graphically indicated by arrow 140 is the amplitude of the reference sawtooth waveform, which is controlled by amplitude control. This signal amplitude is adjustable, as is the frequency of the sawtooth wave. Being able to adjust the frequency and amplitude of the waveform generated by electric signal generator 10 controls the amount of time proportionation accomplished by the invention. When the error signal is relativel close to zero negative potential, as is the case in section 142 of the graph, then the controller remains turned off, as is shown by section 144 of the graph. This is accomplished by means of deadband 146, which is an amount by which the reference signal is offset from zero potential. This offset is accomplished by adding a potential to every point of the internally generated sawtooth waveform by a resistance network or otherwise as indicated by deadband control 14. Operationally, the most positive point, such as 147 of the reference sawtooth waveform is biased to a negative potential determined by the setting of deadband 146. This negative offset from zero potential is adjustable. Functionally, once error signal 114 reaches a point where its potential is more positive than the highest positive potential of the reference sawtooth waveform, then comparator 28 produces no output pulses 32. This is desirable because the deadband corresponds to the range of states of the controlled physical variable within which slight adjustments are not necessary. In the case of a valve, as is used at illustrations throughout this specification, the difference between the top and bottom of deadband 146 may be no more than a few millivolts. The provision of this deadband, within which the controller is not in positive operation, permits the controlled physical variable to be in a state very near the desired reference state without further oscillation of the controller due to insignificant errors. The AC prime mover can then stop operating until the state of the system indicates a deviation from the reference level greater than the acceptable deviation represented by the deadband. This method of control has the practical advantage of not running the controller all the time, with its attendant waste of power and increased probability of breakdown due to a long operating cycle.

The comparator that has been described in FIG. 2 is the comparator of the dual comparator 28 responsive to the negative going output from amplifier 20 and the input from electric signal generator 10 as modified by its controls 12 and 14. The other comparator in dual comparator 28 has as inputs the average of the positive going signal from difference amplifier 20 and the reference waveform that is internally generated by 10. This second comparator produces an output pulse whenever the average signal at its input is greater than ground potential. If the error signal generated by difference amplifier 20 is positive, then less error will make the signal less positive, sic more negative. As the average signal is made more negative, the comparator will produce output pulses of shorter duration separated by longer periods of time. Adjustment of the negative offset deadband 146 of the internally generated electrical signal 15 will change the position, and thus the positive potential, of the average waveform used by averager 24. This adjustment has the effect of causing a greater or lesser amount of positive error signals from difference amplifier 20 to remain positive once it has been averaged with the electric sawtooth signal, which is usually entirely negative without further controller action.

The positive error signal becomes less positive as the prime mover alters the state of the physical variable towards the reference state. Eventually, the positive output of difference amplifier 20, when added to the negative of the sawtooth waveform signal, will be negative over its entire cycle. When this occurs, the output of the comparator will be continuously turned off. The triac controlling the prime mover will remain switched off until the measured state of the system is unacceptably large with respect to the reference signal.

Electric waveform generator 34 or 50 used in the preferred embodiment of the invention functions with its comparator in a manner similar to the operation of the comparators of dual comparator 28 with waveform generator 10. The greatest difference between the comparators of dual comparator 28 and the comparators associated with the triac controllers 46 is the fact that none of the electrical signals associated with triac controller 34 or 46 with change of state of the controlled physical variable. Rather, the input to controller 34 or 46 is pulsed outputs 30 or 32 of dual comparator 28, which are electrical signals having a fixed potential. This potential remains constant during the entire duration of the output pulse from one of the comparators of dual comparator 28. The reference waveform generated by electric signal generators 50 and 36 are adjusted so their negative going potentials cross the constant voltage of the dual comparator's time proportionated pulse. This makes the amount of time triac controllers 46 and 34 switch on triacs 54 and 42, respectively, during the output pulse from the comparators of dual comparator 28 entirely a function of the amplitude and frequency, of electrically generated signals from waveform generator 50 or 36. The triac controllers 46 and 34 can operate without any input other than that from the output of dual comparator 28. They would operate to turn on their respective triacs and thus provide an AC output to the prime mover during the entire duration of the time proportionated pulse put out by dual comparator 28. However, with the comparator triac controller function switched in, the triac controller will turn its associated triac on to provide regular pulses of AC output to the motor, or other prime mover controlling the physical variable for some percentage of the time that it receives a signal from the dual comparator 28. This time proportionation of a time proportionated pulse allows the controller to provide for variable rates of change between states of the controlled physical variable. It allows the controller to change a state variable rapidly in one direction and slowly in the other. This is desirable in many industrial applications where it is desired to turn an input, ie, to a chemical processing plant, or other controlled facility, off very quickly, but to turn it on, ie to add material to a process, very slowly.

FIG. 3 is an electrical schematic diagram showing a commercial embodiment of the invention. In FIG. 3, sawtooth wave generator 210 uses an integrated circuit, a National LM 1458N, to produce a sawtooth waveform. IC 4 is a dual operational amplifier that uses positive feedback in a manner well known to the electronic arts to generate a waveform whose peak to peak voltage is approximately minus 12 volts to plus 12 volts. This output is attenuated by a potentiometer 212, which is the amplitude controller of the waveform generator. Potentiometer 212 is a 10,000 ohm potentiometer. The attenuated output of electrical signal generator 210 is input to an operational amplifier that is one-half of IC 2. IC 2 is another LN 1458N and is wired in parallel with a resistance and a current controlling diode that limits the output of the amplifier to 2.8 volts peak to peak. Deadband controller 214 is connected to a variable positive voltage, controlled by a current regulating diode. The deadband controller introduces this positive voltage to the same input of the operational amplifier as fed by waveform generator 210. Operational amplifier IC 2 functions as an inverter. This means the positive voltage added by the offset, or deadband adjustment, will result in a negative offset at the output 216 of the operational amplifier. This output corresponds to the output at output 15 in FIG. 1 and is the amplitude controlled and offset and electrically generated signal utilized by the commercial embodiment of the invention.

Sensor 218 is a variable resistance, such as a slide wire, responsive to the state of a physical variable, such as the position of a valve. A regulated current controlled by operational amplifier 220 is introduced by this variable resistance. As the resistance varies with the state of the variable and the current is held constant, the voltage in the circuit varies between approximately one and five volts. This is well known to the electronic arts.

A reference voltage is introduced through reference voltage inputs 222. This reference voltage is also between one to five volts. The polarity of the sensor output voltage is added to cancel the reference voltage where they are connected at input 224 of difference amplifier 226. This difference amplifier is an integrated circuit operational amplifier. Specifically, it is one-half of IC 3, which is another LN 1458N. Current limiting diodes D 13, D 14, D 15 and D 16, which are 1N 5229s operate to limit output 228 of difference amplifier 226 to 2.8 volts peak to peak. The error signal output 228 of difference amplifier 226 is introduced to pin 5 of dual comparator 230. Output 216 is input to pin 4 of dual comparator 230. Pin 4 and Pin 5 of dual comparator 230 are the two inputs to one of the comparators of the dual comparator. Specifically, they are the inputs to the comparator whose output is provided at pin 1 of the dual comparator. This comparator will be called comparator "A". Comparator A produces the up signal that controls a solid state switching means described below. This comparator of dual comparator 230 operates to produce an electric pulse output at pin 1 whenever the voltage at pin 5 is less than the voltage at pin 4. The operation of the comparator has been discussed at length above and need not be repeated here. The other comparator of dual comparator 230, which is called comparator "B", has an input at pin 10 and pin 11. Output 216 of waveform generator 210 and output 228 of difference amplifier 226 are combined by resistence network 232', which consists of two 2,000 ohm resistors, one connected to each input. The resistors are also connected to pin 11, which is an input to comparator B. The other input to comparator B is pin 10 which, as shown, is connected to ground. Comparator B is adapted to provide an output pulse at pin 13, which is the down output of the dual comparator, whenever the average potential of waveform input 216 and error signal 228 is greater than the ground potential registered at pin 10 of the dual comparator.

When comparator A is producing an output pulse, pin 7 of dual comparator 230 is connected to a −15 volt supply. This minus 15 volts supply operates through resistence R30, which is a 10,000 ohm resistor, to lower the voltage input to pin 11, which is the average signal input to comparator B, and thus inhibits the operation of comparator B. Conversely, when comparator B is producing an output pulse, pin 9 is connected to the minus 15 volts supply and pin 7 is disconnected from the supply. In this mode the minus 15 volt supply operates through R29 which is a 10,000 ohm resistance to lower the potential at pin 4 of dual comparator 230, which is the waveform signal input signal to comparator A. This negative potential inhibits the operation of comparator A. Thus, comparator A and comparator B cannot operate at the same time. This is the anticoincident means used by the commercial embodiment of the invention.

Figure 3A:
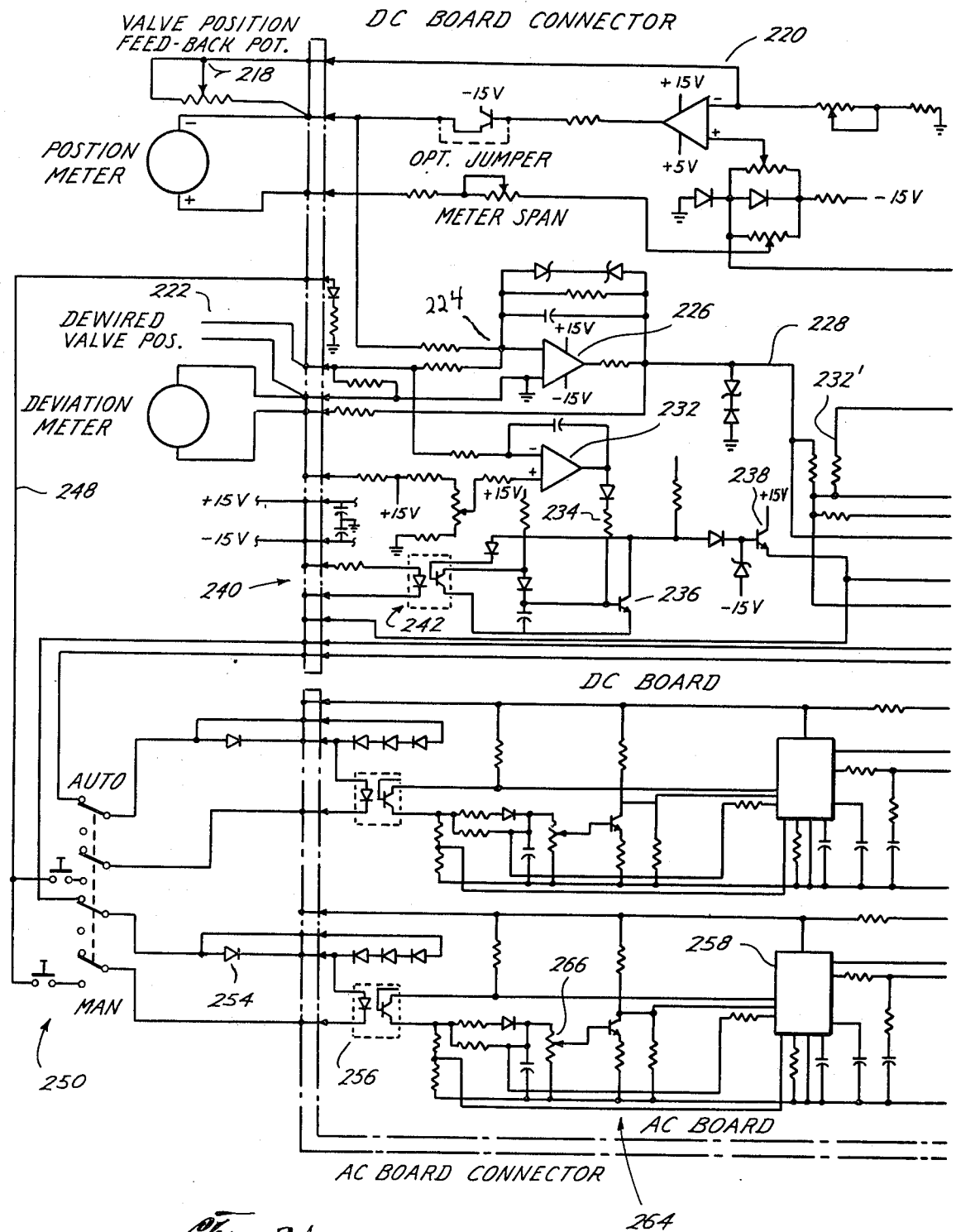
FIGS. 3A and 3B are electrical schematic diagrams illustrating a commercial embodiment of the solid state controller of the present invention.
Figure 3B:
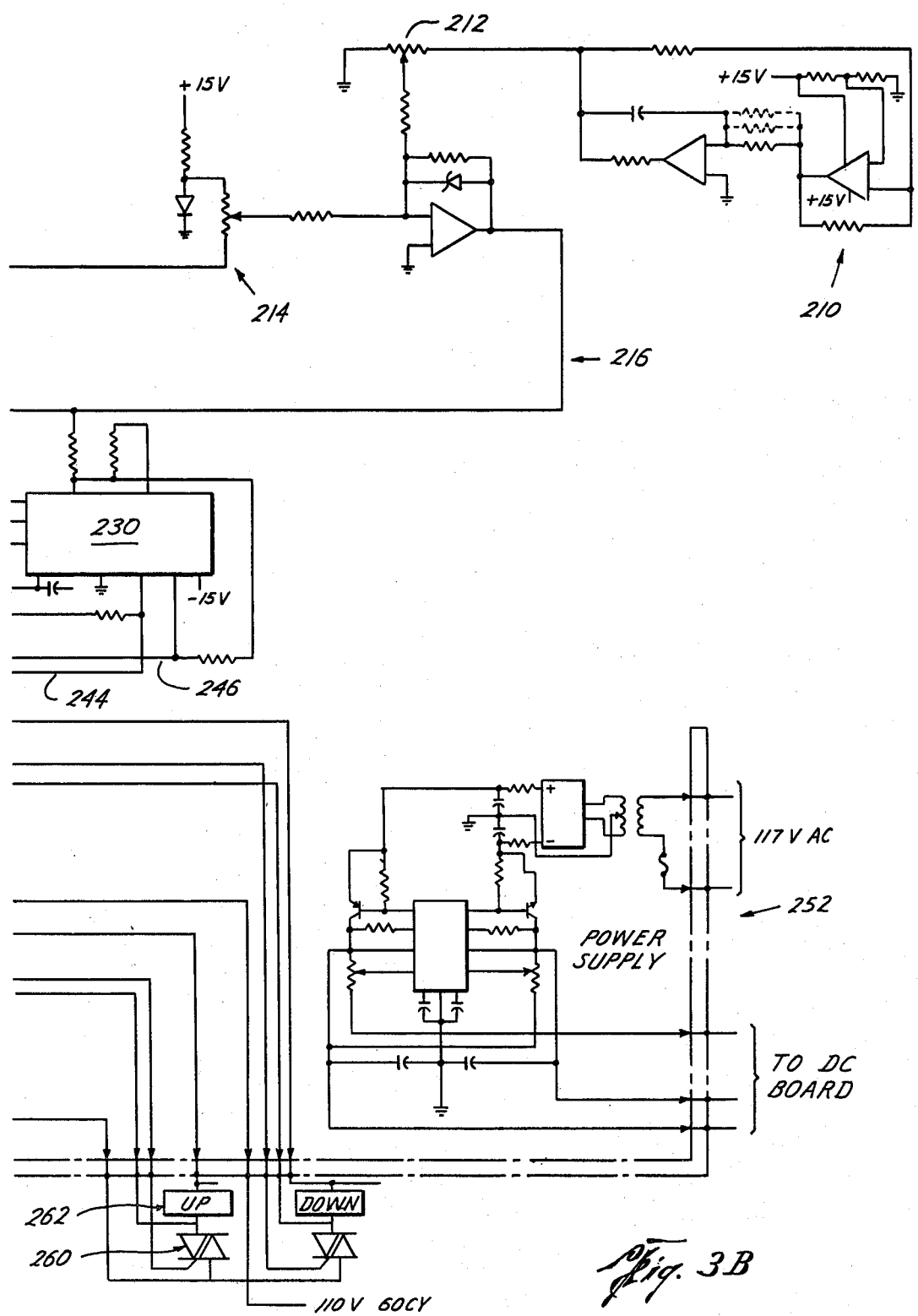

If no voltage appears across reference input 222 of the embodiment shown in FIGS. 3A and 3B, input 2 of operational amplifier 232 goes to ground potential. Operational amplifier 232 is one-half of an LM 1458N integrated circuit. The output 234 of operational amplifier 232 normally biases transistor 236 and keeps it in a nonconducting mode. When input 2 of operational amplifier 232 goes to ground potential, its output 234 allows transistor 236, which is a Motorola MPS 406, to conduct. Transistor 238 is biased so as to be normally conducting and provides an input of approximately +5 volts to pin 14 of dual comparator 230. Removal of this 5 volt potential at pin 14 of dual comparator of 230 inhibits operation of the dual comparator. When current flows through transistor 236, to the bias is removed from the base of transistor 238 (which is a Motorola MJE340) transistor 238 is made non-conducting. This removes the five volt potential from pin 14 of dual comparator 230 and inhibits the comparators operation. While the operation of the comparator is inhibited no output pulses are produced at either pine 13 or 1. Thus, upon the failure of the input reference signal, operational amplifier 232 provides an output to transistor 236 that causes it to conduct causing transistor 238 to cease conducting, which removes a voltage input necessary for the operation of dual comparator 230. This is the failure protection, or inhibiting, means of the commercial embodiment of the invention.

It will readily be understood that on loss or failure of the feedback voltage, the dual comparator could also be inhibited from providing any output pulses.

When the reference signal fails, the operation of operational amplifier 232 causes transistor 236 to latch in the conducting mode. To reset the reference failure protection means of the commercial embodiment of the invention, it is necessary to provide a pulse of current to counteract the bias imparted to transistor 236. This is accomplished by means of reset input 240 that is connected to the phototransistor of an optoelectric switch 242. Optoelectric switch 242 is a Monsanto MCT26 optoisolator. When a pulse of a few volts at approximately 10 milliamps is applied to reset inputs 240, optoelectric switch 242 causes a pulse of electric current to travel to the collector of transistor 236. This pulse of current counteracts the bias placed on transistor 236 by operational amplifier 232 when the reference signal failed. Transistor 236 is unlatched and again becomes nonconducting. When transistor 236 is nonconducting, there is no current flowing to the base of transistor 238, which again conducts and supplies the requisite voltage to pin 14 of dual comparator 230. This voltage allows the comparator to resume normal operation if reference voltage has been restored.

All of the above discussed components are mounted on a single circuit board, which is denominated "DC Board" in FIGS. 3A and 3B. Three conductors, other that power supply conductors, connect the DC Board with the other circuit board, which is denominated "AC Board" in FIGS. 3A and 3B. These three connectors are: the "down" connector 244, which corresponds to output 30 in FIG. 1; the "up" connector 246, which corresponds to output 32 in FIG. 1, and a ground connector 248. Connector 244 comes from pin 13 of dual comparator 230 and connector 246 comes from pin 1. As will be recalled from the discussion above, these are the comparator outputs of the dual comparator. The outputs of the dual comparator are connected to solid state switching means of the invention through manual-automatic switching means 250. This switching means is a way of connecting the solid state relay means to a manual control. The manual control is two push buttons. One causes the solid state switch means to alter the controlled vehicle in one direction and the other causes variance of the control variable in the other direction.

Both the AC Board and the DC Board shown in FIGS. 3A and 3B are connected to a power supply 252 which is on the AC Board and provides both 110 volts AC and regulated 15 volts DC to the invention. Such power supplies are well known to the art and need not be described here.

The AC Board contained in FIGS. 3A and 3B contains two solid state relays with time proportinating electric signal generators and comparators. Since these units are identical, only the circuit connected to the up output, 246, of the comparator will be described. It is understood that the other channel or control circuit is identical to this up circuit in operation.

The solid state relays may be manually operated by placing manual-automatic switch 250 in the manual position. This allows an operator to override the automatic control on the controlled variable.

When manual-automatic switch 250 is placed in the automatic position, the output of up comparator output 246 is connected to input 254 of an optoelectric isolator 256. This isolator is a Monsanto MCT 26 optoisolator, as was optoisolator 242. The output pulse from terminal 1 of dual comparator 230 is a few volts at a little over 10 milliamps. This voltage and current is sufficient to trigger optoelectric switch 256. When this switch is conducting, a voltage is applied to pin 2 of IC 1, which is a Fairchild 742 DC integrated circuit. IC 1 is comparator triac controller 258, which corresponds to comparator triac controller 34 of FIG. 1. When the optoelectric switch provides an input to pin 2 of IC 1, then input to pin 3 of IC 1 is at ground potential. This causes the traic controller of IC 1 to switch on triac 260, which is connected in series with load 262. Triac controller 258 is a zero crossing AC trigger as is fully described in the publication by R. Hood cited above. The use of this type of trigger allows the triac to switch on at a very low voltage, typically seven volts for the present invention, and avoid the problems associated with switching on high voltages. Triac 260 corresponds to triac 42 of FIG. 1 and load 262 corresponds to prime mover 44 of FIG. 1.

When operated as a comparator controller, integrated circuit 258 has an input at pin 3 from a sawtooth waveform generator 264. This waveform generator is well known to the art. The amplitude of waveform generator 264 is adjustable by means of amplitude control 266. Amplitude control 266 is a one megohm potentiometer. When comparator triac 258 has switched on triac 60, then positive feedback from pin 6 of integrated circuit 258 stabilizes and latches the output of optoelectric switch 256. As was described above, the constant potential time proportionated input from the optoelectric isolator 256 and the variable amplitude input from electric signal generator 264 combine in the comparator section in integrated circuit 258 to generate a further time proportionated from the time proportioned input. This allows the establishment of a variable rate of change of the physical variable controlled by triac 260 and prime mover 262.

Although the devices described in detail, supra, have been found to be most satisfactory and preferred, many variations in their structure and use are, of course, possible. For example, instead of valve position, the system could control flow, ground level, temperature, etc.

Also, the source could be other than alternating current with the appropriate driver. Moreover, feedback could be detected as failed.

The above are, of course, merely exemplary of the many possible changes or variations.

Because many varying and different embodiments may be made within the scope of the inventive concept herein taught, and becasue many modifications may be made in the embodiment herein detailed in accordance with the descriptive requirements of the law, it is to be understood that the details herein are to be interpreted as illustrative and not in a limiting sense.

What is claimed as invention is:

1. A control system for controlling a process variable to a set point by manipulating a valve by an actuator and having the set point, process variable, and valve position as inputs, comprising:

a controller having at least one adjustable mode of control, and including means for adjusting said mode of control, and having the set point and the process variable as inputs and having an output responsive to the difference between the set point and the process variable by said mode of control, each value of said output corresponding to a position of the valve;

solid state relay means for positioning the valve to the position required by said output of said controller by control of the power to the actuator, and having said output and the valve position as inputs, said relay means including time proportioning means for regulating the rate of travel of the valve during fixed time periods by diminishing the duration of power applied to the actuator during said fixed time periods as the valve position approaches the position required by said output.

2. The system of claim 1 wherein there is further included means for inhibiting power applied by said relay means to the actuator upon loss of a predetermined input.

3. In a control system for controlling a process variable to a set point by manipulating the valve by an actuator through a controller having at least one adjustable mode of control and including means for adjusting the mode of control, and having the set point and the process variable as inputs and having an output responsive to the difference between the set point and the process variable by the mode of control, each value of said output corresponding to a position of the valve, the improvement comprising:

a solid state relay for positioning the valve to the position required by the output of the controller by control of the power to the actuator, said relay having the output and the valve position as inputs, and said relay including time proportioning means for regulating the rate of travel of the valve during fixed time periods by diminishing the duration of power applied to the actuator during said fixed time periods as the valve position approaches the position required by the output.

* * * * *